(12) United States Patent
Greenfield et al.

(10) Patent No.: US 6,415,614 B1
(45) Date of Patent: Jul. 9, 2002

(54) COFLUIDS FOR USE WITH CARBON DIOXIDE REFRIGERANT

(75) Inventors: Michael L. Greenfield, Ann Arbor; John J. Meyer, Northville; George Mozurkewich, Jr., Plymouth; William F. Schneider, Northville, all of MI (US); Leonard I. Stiel, Malverne, NY (US)

(73) Assignees: Visteon Global Technologies, Inc.; Ford Global Technologies, Inc., both of Dearborn, MI (US)

(*) Notice: Subject to any disclaimer, the term of this patent is extended or adjusted under 35 U.S.C. 154(b) by 0 days.

(21) Appl. No.: 09/840,337

(22) Filed: Apr. 23, 2001

(51) Int. Cl.⁷ .............................................. F25B 15/00
(52) U.S. Cl. ........................................ 62/112; 62/114
(58) Field of Search ............................ 62/112, 114, 476

(56) References Cited

U.S. PATENT DOCUMENTS

| | | | |
|---|---|---|---|
| 4,448,031 A | 5/1984 | Rojey et al. | 62/101 |
| 4,707,996 A | 11/1987 | Vobach | 62/114 |
| 4,724,679 A | 2/1988 | Radermacher | 62/101 |
| 5,357,782 A | 10/1994 | Henry | 73/40.7 |
| 5,582,020 A | * 12/1996 | Scaringe et al. | 62/102 |
| 5,987,902 A | * 11/1999 | Scaringe et al. | 62/114 |
| 6,073,454 A | 6/2000 | Spauschus et al. | 62/114 |
| 6,112,547 A | 9/2000 | Spauschus et al. | 62/476 |

FOREIGN PATENT DOCUMENTS

WO          WO 96/07088          3/1996          ............ G01M/3/20

OTHER PUBLICATIONS

Mozurkewich et al., "Cycle–Model Assessment of Working Fluids . . . ," Publication by Society of Automotive Engineers, 9 pages (2000).
Greenfield et al., "Thermodynamic and Cycle Models for a Low–Pressure . . . ," SAE Technical Paper Series, pp. 1–11 (1999).

* cited by examiner

*Primary Examiner*—Denise L. Esquivel
*Assistant Examiner*—Malik N. Drake
(74) *Attorney, Agent, or Firm*—MacMillan, Sobanski & Todd, LLC

(57) ABSTRACT

A carbon dioxide/cofluid mixture is provided for use in a refrigeration cycle in which the carbon dioxide is alternately absorbed and desorbed from the cofluid. The mixture includes from 50% to 95% cofluid and from 5% to 50% carbon dioxide. The cofluid is selected so that the mixture falls within region A of the plot of $p^{vap}$ versus $\Delta h^{soln}$ shown in FIG. 3. The $\Delta h^{soln}$ of the mixture is the differential heat of solution of the carbon dioxide in the cofluid at 5 wt % and 0° C. The $p^{vap}$ of the mixture is the vapor pressure of the carbon dioxide over the solution at 20 wt % and 40° C.

20 Claims, 2 Drawing Sheets

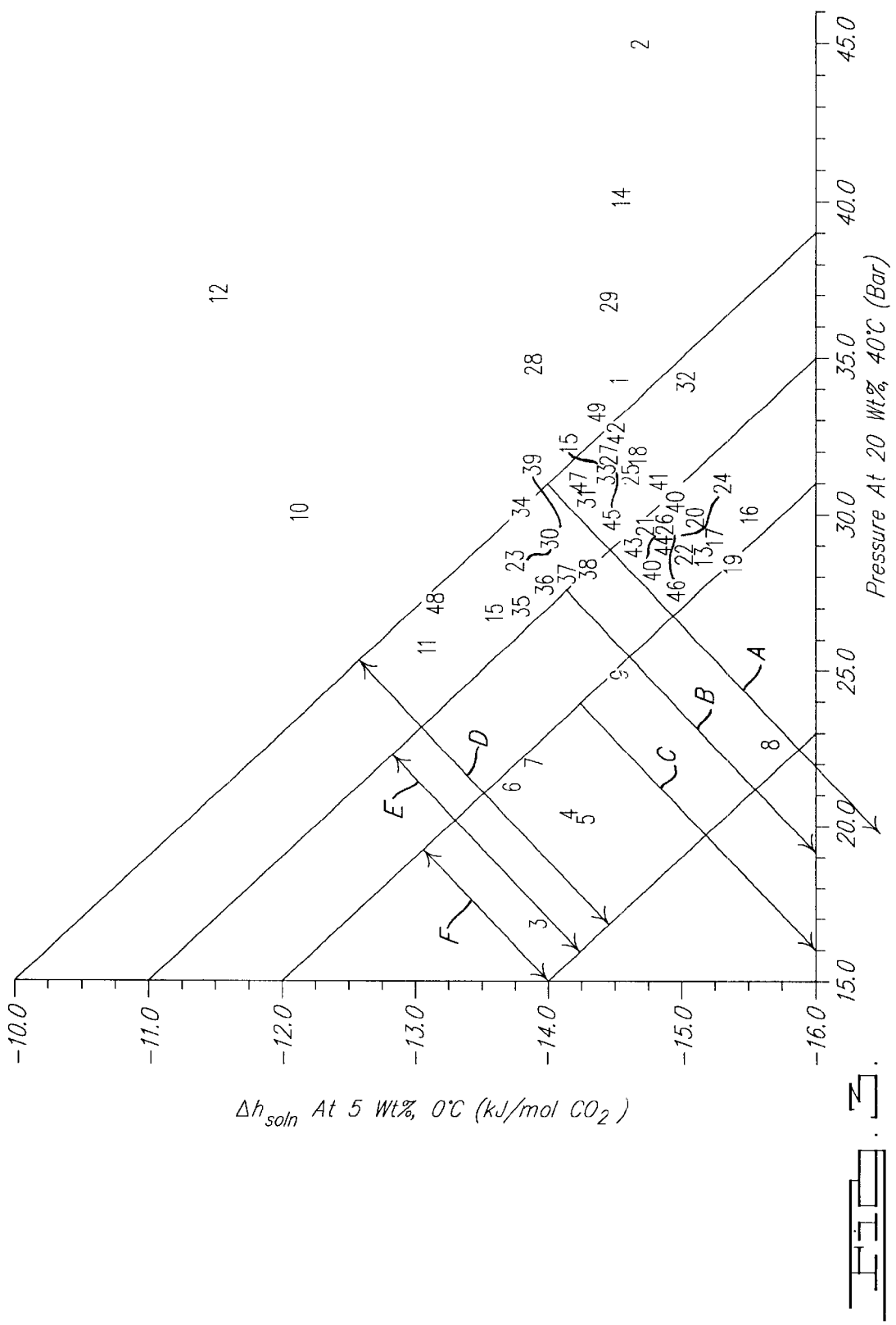

COFLUIDS FOR USE WITH CARBON DIOXIDE REFRIGERANT

FIELD OF INVENTION

The present invention relates generally to refrigerants for use in refrigeration systems, and more specifically to mixtures of carbon dioxide refrigerant and liquid cofluid for use in a $CO_2$-cofluid refrigeration cycle with wet compression. More particularly, the invention relates to a method of selecting liquid cofluids which optimize the performance of such a refrigeration cycle.

BACKGROUND OF THE INVENTION

Refrigeration systems are prevalent in our everyday life. They can be found in such varied locations as automobiles, refrigerators and freezers, air conditioning systems, supermarket display cases and many other applications. The most widely used refrigeration cycle in refrigeration systems is the vapor compression refrigeration cycle. In this cycle, the refrigerant is alternately compressed to condense the refrigerant, and decompressed to evaporate the refrigerant, thereby causing the refrigerant to transfer heat to and from the surrounding environment.

In the past, chlorofluorocarbons such as CFC-12 were the most commonly used vapor compression refrigerants. However, the phase out of chlorofluorocarbons, to protect the ozone layer, has caused a shift away from chlorofluorocarbons toward hydrofluorocarbon refrigerants, such as R-134a, a substitute refrigerant with no ozone depletion potential. More recently, concerns have arisen regarding the potential contribution of man-made refrigerant gases to global warming. Therefore, the search continues for refrigerants that are environmentally friendly.

Carbon dioxide is receiving increased attention as an alternative to today's commonly used refrigerants. Carbon dioxide is attractive as a refrigerant because it is a "natural" material, present in abundance in the environment. The quantities used in refrigeration systems are too small to contribute to global warming. Consequently, significant attention has been directed to the use of carbon dioxide as a refrigerant using a transcritical carbon dioxide cycle. In this refrigeration cycle, the condenser of the traditional vapor compression cycle is replaced with an ultra-high pressure gas cooler and phase change does not occur.

A practical concern with the transcritical carbon dioxide cycle is its extremely high operating pressures. The components of the refrigeration system must be redesigned to withstand ultra-high pressures. Furthermore, the question of leakage control at ultra-high pressures has not been resolved. Another practical concern is efficiency, measured as the coefficient of performance (COP). The environmental benefit of an alternative refrigeration system is a function not only of the environmental friendliness of the refrigerant but also of its impact on the energy required (and consequently carbon dioxide produced) to satisfy the refrigeration requirements.

In a recent development, the environmental friendliness of carbon dioxide as a refrigerant has been retained while addressing its high operating pressure and limited efficiency by introducing a liquid cofluid into which carbon dioxide can absorb. The mixture of carbon dioxide and cofluid is used in a $CO_2$-cofluid refrigeration cycle with wet compression. With a suitable choice of cofluid, absorption and desorption of carbon dioxide from solution replaces condensation and evaporation of pure carbon dioxide in the refrigeration cycle. These processes occur at significantly lower pressures while retaining adequate refrigeration capacity. However, currently known cofluids are not always optimal in terms of performance, environmental impact and/or commercial availability. Therefore, a need exists for additional types of cofluids having desirable properties for use in admixture with carbon dioxide in such a refrigeration cycle.

SUMMARY OF THE INVENTION

The present invention satisfies the above-described need by providing a carbon dioxide/cofluid mixture for use in a $CO_2$-cofluid refrigeration cycle with wet compression. In this refrigeration cycle, the carbon dioxide is alternately absorbed and desorbed from the cofluid. The mixture comprises, by weight, from about 50% to about 95% cofluid and from about 5% to about 50% carbon dioxide. The cofluid is selected so that the mixture falls within region A of the plot of $p^{vap}$ versus $\Delta h^{soln}$ shown in FIG. 3. The $\Delta h^{soln}$ of the mixture is the differential heat of solution of the carbon dioxide in the cofluid at 5 wt % and 0° C. The $p^{vap}$ of the mixture is the vapor pressure of the carbon dioxide over the solution at 20 wt % and 40° C.

In another embodiment of the invention, the cofluid of the carbon dioxide/cofluid mixture has a thermal conductivity of greater than 0.12 W/m-K at 27° C.

In another embodiment of the invention, the cofluid is selected so that the mixture falls within region A of the plot shown in FIG. 3, excluding cofluids 3, 11, 13, 15, 26 and 31 listed in Table 1.

In a further embodiment of the invention, the cofluid is selected from the group consisting of cofluids 4–9, 16–25, 27, 30, and 32–48 listed in Table 1.

The invention also relates to a method of screening a cofluid for producing the carbon dioxide/cofluid mixture. The method comprises the steps of: (a) determining through measurement or appropriate models $p^{vap}$ and $\Delta h^{soln}$ for a carbon dioxide/cofluid mixture containing the cofluid to be screened; and (b) selecting the cofluid if it falls within region A of the plot of $p^{vap}$ versus $\Delta h^{soln}$ shown in FIG. 3, and rejecting the cofluid if it does not fall within region A.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is a plot of $\Delta h^{soln}$ versus $p^{vap}$ for the cofluids listed in Table 1 of the specification, showing regions of the plot which are used for selecting or rejecting the cofluids for use in the invention.

DETAILED DESCRIPTION OF THE PREFERRED EMBODIMENT

Figure 1:
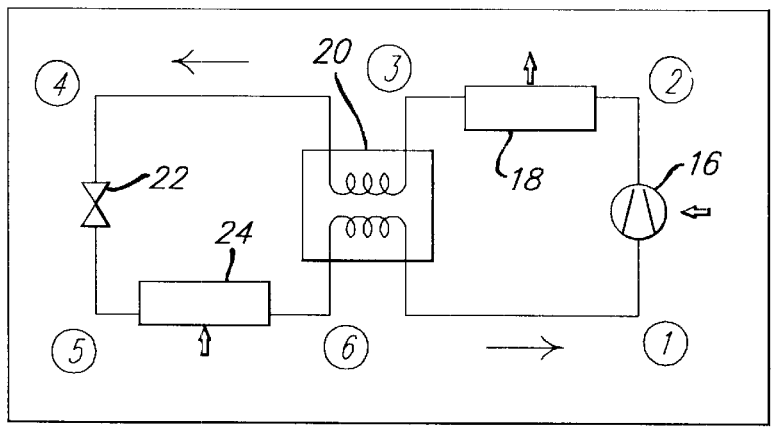
FIG. 1 is a schematic diagram of typical hardware components of a refrigeration system in which the carbon dioxide/cofluid mixture of the invention can be used.
Figure 2:
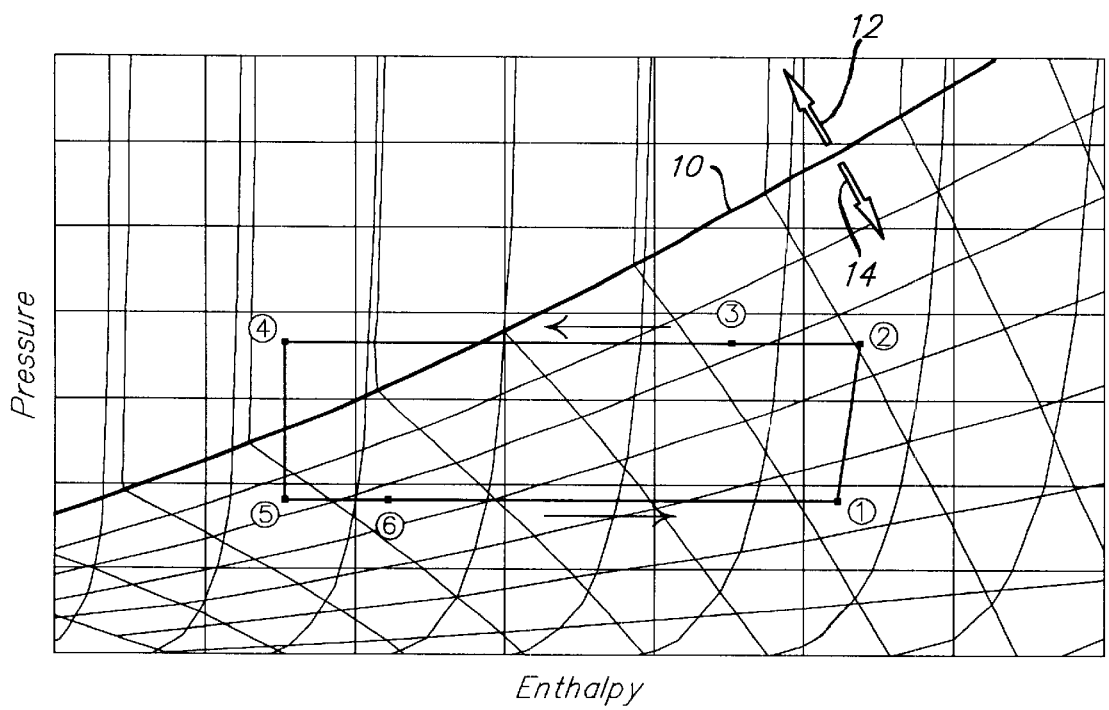
FIG. 2 is a representative refrigeration cycle, plotted on a pressure-enthalpy diagram, which illustrates the operation of the refrigeration system of FIG. 1.

Referring now to the drawings, FIGS. 1 and 2 illustrate a typical refrigeration system in which the carbon dioxide/cofluid mixture of the invention can be used. FIG. 1 shows the typical hardware components used in such a refrigeration system. In FIG. 2, a representative refrigeration cycle illustrating the operation of the system is plotted on a pressure-enthalpy diagram. Line 10 in the diagram is the full resorption boundary 10. Above the full resorption boundary 10, the carbon dioxide/cofluid mixture exists as a single liquid phase (carbon dioxide absorbed in the liquid cofluid), as indicated by the arrow 12. Below the full resorption boundary 10, the carbon dioxide/cofluid mixture exists as two phases (vapor and liquid), as indicated by the arrow 14.

The refrigeration cycle operates as follows. A combination of vapor and liquid is compressed in a compressor 16 (between points 1 and 2), raising the pressure and forcing some of the vapor into the liquid phase. Heat is rejected to the environment in the resorber 18 (between points 2 and 3), cooling the mixture and causing more of the $CO_2$ vapor to be absorbed. The remaining $CO_2$ vapor and "strong" liquid are further cooled in an internal heat exchanger 20 (between points 3 and 4). The cool, fully liquefied mixture is then passed through an expansion device 22 (between points 4 and 5), decreasing the pressure, dropping the temperature further, and releasing some of the $CO_2$ into the vapor phase. Heat is extracted from the refrigerated space into the desorber 24 (between points 5 and 6) as the temperature of the mixture rises and further $CO_2$ escapes from the liquid phase. Finally, the fluids are further warmed in the internal heat exchanger 20 (between points 6 and 1), completing the cycle.

The present invention provides a refined method of selecting liquid cofluids for use in admixture with a carbon dioxide refrigerant in such a refrigeration cycle. Work was conducted to study the dependence of the performance of the refrigeration cycle on the properties of the carbon dioxide/cofluid mixture. The method of selecting cofluids was developed by the use of calculations based on a thermodynamic property model, in combination with the analysis of experimental data.

In one embodiment of the invention, it was determined that two properties of the carbon dioxide/cofluid mixture play a large role in determining the performance of the refrigeration cycle. The first property is the vapor pressure of the carbon dioxide over the carbon dioxide/cofluid mixture, $p^{vap}$, at 20 wt % $CO_2$ and 0° C. Lower vapor pressures lower the optimal operating pressures at fixed carbon dioxide loading. For a fixed range of operating pressures, lower vapor pressure allows higher carbon dioxide loadings, higher specific capacities, and higher coefficients of performance.

The second property is the differential heat of solution of the carbon dioxide in the carbon dioxide/cofluid mixture, $\Delta h^{soln}$, at 5 wt % $CO_2$ and 0°C. Increasingly negative heats of solution contribute to higher specific refrigeration capacities and increased coefficient of performance.

In another embodiment of the invention, it was determined that the thermal conductivity of the cofluid is also important in determining the performance of the refrigeration cycle, particularly when the refrigeration system uses a heat exchanger with limited heat transfer area. As most of the heat transfer in the heat exchanger is sensible (occurs with temperature change), the thermal conductivity becomes an important factor contributing to the performance of the refrigeration cycle. In general, the higher the thermal conductivity the better, but in practice cofluids with thermal conductivities greater than 0.12 W/m-K at 27° C. are preferred, those with thermal conductivities greater than 0.14 W/m-K at 27° C. are more preferred, and those with thermal conductivities greater than 0.16 W/m-K at 27° C. especially preferred.

Table 1 below lists the identities and properties of some cofluids which were screened for use in the invention. Specifically, the table lists the following: the corresponding label used to locate the cofluid on the plot shown in FIG. 3; the cofluid name (if it is simple); the shorthand cofluid chemical formula (CxHyOz); the cofluid family; the differential heat of solution of carbon dioxide in a mixture with the cofluid, $\Delta h^{soln}$, at 5 wt % $CO_2$ and 0° C.; the vapor pressure of the carbon dioxide over the carbon dioxide/cofluid mixture, $p^{vap}$, at 20 wt % $CO_2$ and 40° C.; and the thermal conductivity of the cofluid at 27° C. Some of the $\Delta h^{soln}$, $p^{vap}$, and thermal conductivity values are based on experimental data, and some are predictions using correlations developed or known in the literature. The table also lists chemical group(s) R1, R2, R3, R4, R5, R6, R7, R8, R9, R10, R11, which are used to define the molecular structure based on the following cofluid-family-dependent definitions:

Family adipate/pimelate, glutarate, malonate, succinate:

$$R1-O-\overset{O}{\underset{\|}{C}}-R2-\overset{O}{\underset{\|}{C}}-O-R3$$

Family linear diacetate, branched diacetate:

$$CH3-\overset{O}{\underset{\|}{C}}-O-R4-O-\overset{O}{\underset{\|}{C}}-CH3$$

Family propylene glycols:

$$R5-\overset{CH3}{\underset{|}{CH}}-CH2-R6$$

Family dipropylene glycols:

$$R7-\overset{CH3}{\underset{|}{CH}}-CH2-O-\overset{CH3}{\underset{|}{CH}}-CH2-R8$$

Family ester/ether compounds:

$$R9-O-R10-\overset{O}{\underset{\|}{C}}-O-R11$$

TABLE 1

COFLUIDS

| LABEL ON PLOT | NAME | FORMULA | FAMILY | del h soln, 0C, 5% (kJ/mol $CO_2$) | Pvap 40C, 20% (bar) | thermal conduc'ty (W/m-K) |
|---|---|---|---|---|---|---|
| 1 | NMP | | | −14.6 | 33.9 | 0.195 |
| 2 | PC | | | −14.8 | 44.7 | |
| 3 | Acetone | | ketone | −13.9 | 16.6 | 0.177 |

TABLE 1-continued

COFLUIDS

| LABEL ON PLOT | NAME | FORMULA | FAMILY | del h soln, 0C, 5% (kJ/mol $CO_2$) | Pvap 40C, 20% (bar) | thermal conduc'ty (W/m-K) | | | |
|---|---|---|---|---|---|---|---|---|---|
| 4 | 3-pentanone | | ketone | −14.2 | 20.1 | 0.143 | | | |
| 5 | MIPK | | ketone | −14.3 | 20.0 | 0.142 | | | |
| 6 | EtOAc | | monoester | −13.7 | 21.1 | 0.146 | | | |
| 7 | PrOAc | | monoester | −13.9 | 22.0 | 0.140 | | | |
| 7 | EtOpropionate | | monoester | −13.9 | 21.9 | 0.141 | | | |
| 8 | cyclopentanone | | ketone | −15.7 | 22.3 | 0.171 | | | |
| 9 | cyclohexanone | | ketone | −14.5 | 24.6 | 0.140 | | | |
| 10 | BEPDA | | branched diacetate | −12.2 | 29.8 | 0.121 | | | |
| 11 | diethyloxalate | | | −13.1 | 25.5 | | | | |
| 12 | DIAD | | adipate/pimelate | −11.6 | 36.7 | | | | |
| 13 | TEGDME | | | −15.2 | 28.3 | | | | |
| 14 | GBL | | | −14.6 | 39.7 | | | | |
| 15 | DMAA | | | −13.6 | 26.5 | | | | |
| | | | | | | | R1 | R2 | R3 |
| 16 | | C8H14O4 | adipate/pimelate | −15.2 | 28.5 | 0.128 | CH3 | (CH2)4 | CH3 |
| 17 | | C10H18O4 | adipate/pimelate | −15.3 | 29.0 | 0.124 | CH2CH3 | (CH2)4 | CH2CH3 |
| 24 | | C9H16O4 | adipate/pimelate | −15.1 | 29.3 | 0.126 | CH3 | (CH2)3CHCH3 | CH3 |
| 18 | | C10H18O4 | adipate/pimelate | −14.7 | 31.4 | 0.124 | CH3 | CHCH3(CH2)2CHCH3 | CH3 |
| 19 | | C9H16O4 | adipate/pimelate | −15.4 | 28.2 | 0.126 | CH3 | (CH2)5 | CH3 |
| 20 | | C11H20O4 | adipate/pimelate | −15.1 | 29.6 | 0.123 | CH2CH3 | (CH2)5 | CH2CH3 |
| | | | | | | | | R4 | |
| 21 | | C6H10O4 | branched diacetate | −14.7 | 29.4 | 0.133 | | CHCH3 | |
| 22 | PGDA | C7H12O4 | branched diacetate | −15.1 | 28.6 | 0.130 | | CH(CH3)CH2 | |
| 23 | | C7H12O4 | branched diacetate | −13.8 | 28.2 | 0.129 | | C(CH3)2 | |
| 24 | | C8H14O4 | branched diacetate | −15.1 | 29.0 | 0.128 | | CH(CH3)CH2CH2 | |
| 24 | | C8H14O4 | branched diacetate | −15.1 | 29.0 | 0.128 | | CH2CH(CH3)CH2 | |
| 25 | | C8H14O4 | branched diacetate | −14.7 | 30.9 | 0.128 | | CH(CH3)CH(CH3) | |
| 24 | | C9H16O4 | branched diacetate | −15.1 | 29.3 | 0.126 | | CH(CH3)CH2CH2CH2 | |
| 24 | | C9H16O4 | branched diacetate | −15.1 | 29.3 | 0.126 | | CH2CH(C2H5)CH2 | |
| 26 | NPGDA | C9H16O4 | branched diacetate | −14.9 | 29.6 | 0.125 | | CH2C(CH3)2CH2 | |
| 27 | | C9H16O4 | branched diacetate | −14.5 | 31.6 | 0.125 | | C(CH3)2CH2CH2 | |
| 28 | | C9H16O4 | branched diacetate | −13.9 | 34.4 | 0.125 | | C(CH3)2CH(CH3) | |
| | | | | | | | R7 | | R8 |
| 29 | DPME | C7H16O3 | dipropylene glycols | −14.5 | 36.5 | | CH3O | | OH |
| 30 | | C8H18O3 | dipropylene glycols | −13.8 | 28.5 | 0.109 | CH3O | | OCH3 |
| 31 | DPMA | C9H18O4 | dipropylene glycols | −14.3 | 30.2 | 0.115 | CH3O | | O(CO)CH3 |
| 32 | | C10H18O5 | dipropylene glycols | −15.1 | 33.9 | 0.106 | CH3(CO)O | | O(CO)CH3 |
| 33 | | C10H20O4 | dipropylene glycols | −14.5 | 30.9 | 0.114 | CH3CH2O | | O(CO)CH3 |
| 34 | | C10H22O3 | dipropylene glycols | −13.8 | 29.9 | 0.112 | CH3CH2O | | OCH2CH3 |
| | | | | | | | R9 | R10 | R11 |
| 35 | | C5H10O3 | ester/ethers | −13.9 | 26.7 | 0.129 | CH3 | CH2CH2 | CH3 |
| 36 | | C6H12O3 | ester/ethers | −14.0 | 27.4 | 0.125 | CH3CH2 | CH2CH2 | CH3 |
| 37 | | C7H14O3 | ester/ethers | −14.2 | 27.7 | 0.122 | CH(CH3)2 | CH2CH2 | CH3 |
| 37 | | C7H14O3 | ester/ethers | −14.2 | 27.8 | 0.122 | CH3CH2 | CH2CH2 | CH3CH2 |
| 38 | | C8H16O3 | ester/ethers | −14.3 | 27.9 | 0.120 | CH(CH3)2 | CH2CH2 | CH3CH2 |
| 39 | | C9H18O3 | ester/ethers | −14.1 | 29.6 | 0.118 | CH(CH3)2 | CH2CH2 | CH(CH3)2 |
| | | | | | | | R1 | R2 | R3 |
| 24 | | C7H12O4 | glutarates | −15.1 | 28.8 | 0.130 | CH3 | (CH2)3 | CH3 |
| 19 | | C9H16O4 | glutarates | −15.4 | 28.2 | 0.126 | CH3CH2 | (CH2)3 | CH2CH3 |
| 24 | | C8H14O4 | glutarates | −15.1 | 29.0 | 0.128 | CH3 | CH2CHCH3CH2 | CH3 |
| 40 | | C10H18O4 | glutarates | −15.0 | 30.1 | 0.124 | CH3CH2 | CHCH3(CH2)2 | CH2CH3 |
| 41 | | C9H16O4 | glutarates | −14.8 | 30.6 | 0.126 | CH3 | CHCH3CH2CHCH3 | CH3 |
| 24 | | C9H16O4 | glutarates | −15.1 | 29.3 | 0.126 | CH3 | CH2C(CH3)2CH2 | CH3 |
| 42 | | C11H20O4 | glutarates | −14.6 | 32.2 | 0.123 | CH3CH2 | CHCH3CH2CHCH3 | CH2CH3 |
| 43 | | C5H8O4 | malonates | −14.7 | 28.8 | 0.136 | CH3 | CH2 | CH3 |
| 44 | | C6H10O4 | malonates | −14.9 | 28.9 | 0.133 | CH3 | CH2 | CH2CH3 |
| 24 | | C7H12O4 | malonates | −15.1 | 28.8 | 0.130 | CH2CH3 | CH2 | CH2CH3 |
| 45 | | C8H14O4 | malonates | −14.5 | 31.3 | 0.127 | CH3 | CH2 | C(CH3)3 |
| 27 | | C9H16O4 | malonates | −14.5 | 31.6 | 0.125 | CH3CH2 | CH2 | C(CH3)3 |
| 19 | | C9H16O4 | malonates | −15.4 | 28.2 | 0.126 | CH3CH2 | CH2 | (CH2)3CH3 |
| 19 | | C9H16O4 | malonates | −15.4 | 28.2 | 0.126 | CH3(CH2)2 | CH2 | (CH2)2CH3 |
| 41 | | C9H16O4 | malonates | −14.8 | 30.6 | 0.126 | (CH3)2CH | CH2 | CH(CH3)2 |
| 21 | | C6H10O4 | malonates | −14.7 | 29.4 | 0.133 | CH3 | CHCH3 | CH3 |
| 24 | | C8H14O4 | malonates | −15.1 | 29.0 | 0.128 | CH3CH2 | CHCH3 | CH2CH3 |
| 46 | | C7H12O4 | malonates | −14.9 | 29.3 | 0.130 | CH3 | CHCH2CH3 | CH3 |
| 24 | | C9H16O4 | malonates | −15.1 | 29.3 | 0.126 | CH3CH2 | CHCH2CH3 | CH2CH3 |
| 27 | | C9H16O4 | malonates | −14.5 | 31.6 | 0.125 | CH3CH2 | C(CH3)2 | CH2CH3 |

TABLE 1-continued

COFLUIDS

| LABEL ON PLOT | NAME | FORMULA | FAMILY | del h soln, 0C, 5% (kJ/mol $CO_2$) | Pvap 40C, 20% (bar) | thermal conduc'ty (W/m-K) | | | |
|---|---|---|---|---|---|---|---|---|---|
| 27 | | C9H16O4 | malonates | −14.5 | 31.6 | 0.125 | CH3 | C(CH3CH2)2 | CH3 |
| 47 | | C11H20O4 | malonates | −14.3 | 30.7 | 0.141 | CH3CH2 | C(CH3CH2)2 | CH2CH3 |
| | | | | | | | | R4 | |
| 44 | | C6H10O4 | n-diacetates | −14.9 | 28.9 | 0.133 | | (CH2)2 | |
| 24 | | C7H12O4 | n-diacetates | −15.1 | 28.8 | 0.130 | | (CH2)3 | |
| 16 | | C8H14O4 | n-diacetates | −15.2 | 28.5 | 0.128 | | (CH2)4 | |
| 19 | | C9H16O4 | n-diacetates | −15.4 | 28.2 | 0.126 | | (CH2)5 | |
| 17 | | C10H18O4 | n-diacetates | −15.3 | 29.0 | 0.124 | | (CH2)6 | |
| | | | | | | | R5 | | R6 |
| 36 | | C6H12O3 | propylene glycols | −14.0 | 27.4 | 0.124 | CH3O | | O(CO)CH3 |
| 37 | | C7H14O3 | propylene glycols | −14.2 | 27.8 | 0.121 | CH3CH2O | | O(CO)CH3 |
| 48 | | C7H16O2 | propylene glycols | −13.2 | 26.9 | 0.114 | CH3CH2O | | OCH2CH3 |
| 24 | | C8H14O4 | propylene glycols | −15.1 | 29.0 | 0.128 | CH3(CO)O | | O(CO)CH2CH3 |
| 24 | | C9H16O4 | propylene glycols | −15.1 | 29.3 | 0.126 | CH3CH2(CO)O | | O(CO)CH2CH3 |
| | | | | | | | R1 | R2 | R3 |
| 44 | | C6H10O4 | succinates | −14.9 | 28.9 | 0.133 | CH3 | (CH2)2 | CH3 |
| 24 | | C7H12O4 | succinates | −15.1 | 28.8 | 0.130 | CH3 | (CH2)2 | CH2CH3 |
| 16 | | C8H14O4 | succinates | −15.2 | 28.5 | 0.128 | CH2CH3 | (CH2)2 | CH2CH3 |
| 46 | | C7H12O4 | succinates | −14.9 | 29.3 | 0.130 | CH3 | CHCH3CH2 | CH3 |
| 24 | | C9H16O4 | succinates | −15.1 | 29.3 | 0.126 | CH3CH2 | CHCH3CH2 | CH2CH3 |
| 49 | | C12H22O4 | succinates | −14.4 | 32.9 | 0.122 | CH3CH2 | (CHC2H5)2 | CH2CH3 |

FIG. 3 is a plot of $\Delta h^{soln}$ versus $p^{vap}$ for the cofluids listed in Table 1. The plotted numbers are the same as the label numbers of the cofluids listed in the table. (Several cofluids have the same label number because they have the same $\Delta h^{soln}$ and $p^{vap}$.) Regions A through F are marked on the plot. In one embodiment of the invention, it was determined that cofluids which fall within region A of the plot optimize the performance of the refrigeration cycle, while cofluids which do not fall within region A are unsuitable for use in the invention. Thus, the plot is useful as a screening method for selecting or rejecting cofluids for use in the invention. In the illustrated embodiment, cofluids having the labels 1, 2, 10, 12, 14, 28, 29 and 49 do not fall within region A, while all the other cofluids do fall within region A. It should be noted that the invention encompasses any cofluids which would fall within region A of the plot, even if the cofluids are never plotted. In some specific preferred embodiments of the invention, the selected cofluid falls within one or more of the other regions marked on the plot: region B, region C, region D, region E and/or region F. It should be noted that regions A, B and C have an upper boundary but no lower boundary, while regions D, E and F have both upper and lower boundaries. Cofluids falling within region B are preferred, and cofluids falling within region C are most preferred.

In a specific embodiment of the invention, the cofluid is selected from the group of cofluids having the labels 4–9, 16–25, 27, 30, and 32–48 listed in Table 1. Preferably, the cofluid is selected from the group consisting of 3-pentanone (label 4), methyl isopropyl ketone (label 5), ethyl acetate (label 6), propyl acetate (label 7), cyclopentanone (label 8), cyclohexanone (label 9), propylene glycol diacetate (label 22), ethylene glycol diacetate (label 44), 1,3-butanediol diacetate (label 24), 1,5-pentanediol diacetate (label 19), dimethyl malonate (label 43), diethyl malonate (label 24), diethyl succinate (label 16), dimethyl glutarate (label 24), dimethyl pimelate (label 19), dimethyl ethyl malonate (label 46), diethyl ethyl malonate (label 24), dimethyl methyl succinate (label 46), dimethyl 3-methyl glutarate (label 24), and mixtures thereof.

In another specific embodiment of the invention, the cofluid falls within region A of the plot shown in FIG. 3, excluding cofluids having the labels 3, 11, 13, 15, 26 and 31 listed in Table 1.

The carbon dioxide/cofluid mixture of the invention comprises, by weight, from about 50% to about 95% cofluid and from about 5% to about 50% carbon dioxide. For optimum performance, as much carbon dioxide as possible is used (e.g., at least about 30 wt %) without exceeding the pressure limitation of the apparatus. The amounts of carbon dioxide and cofluid in the mixture are measured after the resorber 18 of the refrigeration system.

The vapor pressure, temperature, and composition of carbon dioxide dissolved in a liquid cofluid can be measured using many different designs of experimental apparatus. One example is described by O. R. Rivas and J. M. Prausnitz, "Apparatus for Rapid Determination of Low-Pressure Solubilities of Gases in Liquids over a Wide Range of Temperatures. Application to Corrosive Systems", Industrial Engineering and Chemistry Fundamentals, vol 18, pp 289–292 (1979).

The differential heat of solution of the carbon dioxide in the cofluid can be measured directly by using a flow calorimeter, such as that described by J. J. Christensen, L. D. Hansen, R. M. Izatt, D. J. Eatough, and R. M. Hart, "Isothermal, isobaric, elevated temperature, high-pressure flow calorimeter", Review of Scientific Instruments, vol 52, pp 1226–1231 (1981). The differential heat of solution can also be measured indirectly through interpretation of carbon dioxide solubility measurements at different temperatures. First, parameters in a thermodynamic model (such as an activity coefficient model or an equation of state) are selected that minimize the error in the model's representation of the experimental solubility data. Next, the rate of change of carbon dioxide chemical potential with respect to inverse temperature at constant composition is calculated from the thermodynamic model for both the liquid and vapor phases that are in equilibrium with each other. The difference between these two quantities equals the differential heat of solution. An example of this procedure is described by Michael L. Greenfield, George Mozurkewich, William F. Schneider, Gary D. Bramos, and David C. Zietlow, "Thermodynamic and Cycle Models for a Low-Pressure $CO_2$ Refrigeration Cycle", Society of Automotive Engineers, paper 1999-01-0869 (1999). If experimental data are not available, the parameters for the thermodynamic model can be predicted through the use of an appropriate correlation.

The thermal conductivity of the cofluid can be measured directly, using equipment such as that described by Y. S. Touloukian, P. E. Liley and S. C. Saxena, Thermophysical Properties of Matter (IFI/Plenum, New York, 1970), Volume 3 ("Thermal Conductivity—Nonmetallic Liquids and Gases"), Section 4 (Experimental Methods), pages 19a to 21a. In the absence of experimental data, the thermal conductivity can be predicted using methods such as those described by C. Baroncini, P. Di Filippo, G. Latini, and M. Pacetti, "Organic Liquid Thermal Conductivity: A Prediction Method in the Reduced Temperature Range 0.3 to 0.8", International Journal of Thermophysics, vol 2, pp 21–38 (1981).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A carbon dioxide/cofluid mixture for use in a refrigeration cycle in which the carbon dioxide is alternately absorbed and desorbed from the cofluid, the mixture comprising, by weight, from about 50% to about 95% cofluid and from about 5% to about 50% carbon dioxide, the cofluid being selected so that the mixture falls within region A of the plot of $p^{vap}$ versus $\Delta h^{soln}$ shown in FIG. 3, where $\Delta h^{soln}$ is the differential heat of solution of the carbon dioxide in the cofluid at 5 wt % and 0° C., and where $p^{vap}$ is the vapor pressure of the carbon dioxide over the solution at 20 wt % and 40° C.

2. The carbon dioxide/cofluid mixture of claim 1, wherein the mixture falls within region B of the plot shown in FIG. 3.

3. The carbon dioxide/cofluid mixture of claim 1, wherein the mixture falls within region C of the plot shown in FIG. 3.

4. The carbon dioxide/cofluid mixture of claim 1, wherein the mixture falls within region D of the plot shown in FIG. 3.

5. The carbon dioxide/cofluid mixture of claim 1, wherein the mixture falls within region E of the plot shown in FIG. 3.

6. The carbon dioxide/cofluid mixture of claim 1, wherein the mixture falls within region F of the plot shown in FIG. 3.

7. The carbon dioxide/cofluid mixture of claim 1, wherein the cofluid has a thermal conductivity of greater than 0.12 W/m-K at 27° C.

8. The carbon dioxide/cofluid mixture of claim 1, wherein the cofluid has a thermal conductivity of greater than 0.14 W/m-K at 27° C.

9. The carbon dioxide/cofluid mixture of claim 1, wherein the cofluid is selected from the group consisting of diethyl ketone, methyl isopropyl ketone, ethyl acetate, n-propyl acetate, ethyl propionate, cyclopentanone, cyclohexanone, dimethyl adipate, diethyl adipate, dimethyl 2-methyladipate, dimethyl 2,5-dimethyladipate, dimethyl pimelate, diethyl pimelate, 1,1-ethanediol diacetate, 1,2-propanediol diacetate, 2,2-propanediol diacetate, 1,3-butanediol diacetate, 2-methyl-1,3-propanediol diacetate, 2,3-butanediol diacetate, 1,4-pentanediol diacetate, 2-ethyl-1,3-propanediol diacetate, 3-methyl-1,3-butanediol diacetate, dipropylene glycol dimethyl ether, dipropylene glycol diacetate, dipropylene glycol ethyl ether acetate, dipropylene glycol diethyl ether, methyl 3-methoxypropionate, methyl 3-ethoxypropionate, methyl 3-isopropoxypropionate, ethyl 3-ethoxypropionate, ethyl 3-isopropoxypropionate, isopropyl 3-isopropoxypropionate, dimethyl glutarate, diethyl glutarate, 2-methyl-1,3-propanedioic acid dimethyl ester, 2-methyl-1,3-propanedioic acid diethyl ester, 2,4-pentanedioic acid dimethyl ester, 2,2-dimethyl-1,3-propanedioic acid dimethyl ester, 2,4-pentanedioic acid diethyl ester, dimethyl malonate, methyl ethyl malonate, diethyl malonate, methyl tert-butyl malonate, ethyl tert-butyl malonate, ethyl butyl malonate, dipropyl malonate, diisopropyl malonate, 2-methyl-1,3-propanedioic acid dimethyl ester, 2-methyl-1,3-propanedioic acid diethyl ester, 2-ethyl-1,3-propanedioic acid dimethyl ester, 2-ethyl-1,3-propanedioic acid diethyl ester, 2,2-dimethyl-1,3-propanedioic acid diethyl ester, 2,2-diethyl-1,3-propanedioic acid dimethyl ester, 2,2-diethyl-1,3-propanedioic acid diethyl ester, ethylene glycol diacetate, 1,3-propanediol diacetate, 1,4-butanediol diacetate, 1,5-pentanediol diacetate, 1,6-hexanediol diacetate, 2-methoxy-1-propanol acetate, 2-ethoxy-1-propanol acetate, propylene glycol diethyl ether, 1,2-propanediol acetate propionate, 1,2-propanediol dipropionate, dimethyl succinate, methyl ethyl succinate, diethyl succinate, dimethyl methylsuccinate, diethyl methylsuccinate, and mixtures thereof.

10. The carbon dioxide/cofluid mixture of claim 1, wherein the cofluid is selected from the group consisting of 3-pentanone, methyl isopropyl ketone, ethyl acetate, propyl acetate, cyclopentanone, cyclohexanone, propylene glycol diacetate, ethylene glycol diacetate, 1,3-butanediol diacetate, 1,5-pentanediol diacetate, dimethyl malonate, diethyl malonate, diethyl succinate, dimethyl glutarate, dimethyl pimelate, dimethyl ethyl malonate, diethyl ethyl malonate, dimethyl methyl succinate, dimethyl 3-methyl glutarate, and mixtures thereof.

11. A carbon dioxide/cofluid mixture for use in a refrigeration cycle in which the carbon dioxide is alternately absorbed and desorbed from solution in the cofluid, the mixture comprising, by weight, from about 50% to about 95% cofluid and from about 5% to about 50% carbon dioxide, and the cofluid having a thermal conductivity of greater than 0.12 W/m-K at 27° C.

12. The carbon dioxide/cofluid mixture of claim 11, wherein the cofluid has a thermal conductivity of greater than 0.14 W/m-K at 27° C.

13. The carbon dioxide/cofluid mixture of claim 11, wherein the cofluid has a thermal conductivity of greater than 0.16 W/m-K at 27° C.

14. A carbon dioxide/cofluid mixture for use in a refrigeration cycle in which the carbon dioxide is alternately absorbed and desorbed from the cofluid, the mixture comprising, by weight, from about 50% to about 95% cofluid and from about 5% to about 50% carbon dioxide, the cofluid being selected so that the mixture falls within region A of the plot of Pvap versus Δhsoln shown in FIG. 3, where Δhsoln is the differential heat of solution of the carbon dioxide in the cofluid at 5 wt % and 0° C., and where Pvap is the vapor pressure of the carbon dioxide over the solution at 20 wt % and 40° C., excluding acetone, diethyl oxalate, tetraethylene glycol dimethyl ether, N,N-dimethylacetamide, 2,2-dimethyl-1,3-propanediol diacetate, and dipropylene glycol methyl ether acetate.

15. A carbon dioxide/cofluid mixture for use in a refrigeration cycle in which the carbon dioxide is alternately absorbed and desorbed from the cofluid, the mixture comprising, by weight, from about 50% to about 95% cofluid and from about 5% to about 50% carbon dioxide, the cofluid being selected from the group consisting of diethyl ketone, methyl isopropyl ketone, ethyl acetate, n-propyl acetate, ethyl propionate, cyclopentanone, cyclohexanone, dimethyl adipate, diethyl adipate, dimethyl 2-methyladipate, dimethyl 2,5-dimethyladipate, dimethyl pimelate, diethyl pimelate, 1,1-ethanediol diacetate, 1,2-propanediol diacetate, 2,2-propanediol diacetate, 1,3-butanediol diacetate, 2-methyl-1,3-propanediol diacetate, 2,3-butanediol diacetate, 1,4-pentanediol diacetate, 2-ethyl-1,3-propanediol diacetate, 3-methyl-1,3-butanediol diacetate, dipropylene glycol dimethyl ether, dipropylene glycol diacetate, dipropylene glycol ethyl ether acetate, dipropylene glycol diethyl ether, methyl 3-methoxypropionate, methyl 3-ethoxypropionate, methyl 3-isopropoxypropionate, ethyl 3-ethoxypropionate, ethyl 3-isopropoxypropionate, isopropyl 3-isopropoxypropionate, dimethyl glutarate, diethyl glutarate, 2-methyl-1,3-propanedioic acid dimethyl ester, 2-methyl-1,3-propanedioic acid diethyl ester, 2,4-pentanedioic acid dimethyl ester, 2,2-dimethyl-1,3-propanedioic acid dimethyl ester, 2,4-pentanedioic acid diethyl ester, dimethyl malonate, methyl ethyl malonate, diethyl malonate, methyl tert-butyl malonate, ethyl tert-butyl malonate, ethyl butyl malonate, dipropyl malonate, diisopropyl malonate, 2-methyl-1,3-propanedioic acid dimethyl ester, 2-methyl-1,3-propanedioic acid diethyl ester, 2-ethyl-1,3-propanedioic acid dimethyl ester, 2-ethyl-1,3-propanedioic acid diethyl ester, 2,2-dimethyl-1,3-propanedioic acid diethyl ester, 2,2-diethyl-1,3-propanedioic acid dimethyl ester, 2,2-diethyl-1,3-propanedioic acid diethyl ester, ethylene glycol diacetate, 1,3-propanediol diacetate, 1,4-butanediol diacetate, 1,5-pentanediol diacetate, 1,6-hexanediol diacetate, 2-methoxy-1-propanol acetate, 2-ethoxy-1-propanol acetate, propylene glycol diethyl ether, 1,2-propanediol acetate propionate, 1,2-propanediol dipropionate, dimethyl succinate, methyl ethyl succinate, diethyl succinate, dimethyl methylsuccinate, diethyl methylsuccinate, and mixtures thereof.

16. The carbon dioxide/cofluid mixture of claim 15, wherein the cofluid is selected from the group consisting of 3-pentanone, methyl isopropyl ketone, ethyl acetate, propyl acetate, cyclopentanone, cyclohexanone, propylene glycol diacetate, ethylene glycol diacetate, 1,3-butanediol diacetate, 1,5-pentanediol diacetate, dimethyl malonate, diethyl malonate, diethyl succinate, dimethyl glutarate, dimethyl pimelate, dimethyl ethyl malonate, diethyl ethyl malonate, dimethyl methyl succinate, dimethyl 3-methyl glutarate, and mixtures thereof.

17. A method of screening a cofluid for producing a carbon dioxide/cofluid mixture for use in a refrigeration cycle of a refrigeration system in which the carbon dioxide is alternately absorbed and desorbed from the cofluid, the method comprising the steps of:

(a) determining $p^{vap}$ and $\Delta h^{soln}$ for a carbon dioxide/cofluid mixture containing the cofluid to be screened, where $\Delta h^{soln}$ is the differential heat of solution of the carbon dioxide in the cofluid at 5 wt % and 0° C., and where $p^{vap}$ is the vapor pressure of the carbon dioxide over the solution at 20 wt % and 40° C.; and (b) selecting the cofluid if it falls within region A of the plot of $p^{vap}$ versus $\Delta h^{soln}$ shown in FIG. 3, and rejecting the cofluid if it does not fall within region A.

18. The screening method of claim 17, comprising the additional steps, before step (a), of identifying relationships between $p^{vap}$ and $\Delta h^{soln}$ of carbon dioxide/cofluid mixtures and coefficient of performance and refrigeration capacity of the refrigeration system, and determining the screening criteria of step (b) in view of the identified relationships.

19. The screening method of claim 17, wherein the cofluid is selected if it falls within region B of the plot of $p^{vap}$ versus $\Delta h^{soln}$ shown in FIG. 3, and the cofluid is rejected if it does not fall within region B.

20. The screening method of claim 17, wherein the cofluid is selected if it falls within region C of the plot of $p^{vap}$ versus $\Delta h^{soln}$ shown in FIG. 3, and the cofluid is rejected if it does not fall within region C.

* * * * *